(12) United States Patent
Franz et al.

(10) Patent No.: US 7,449,140 B2
(45) Date of Patent: Nov. 11, 2008

(54) MODELING METHOD FOR A METAL

(75) Inventors: Klaus Franz, Nürnberg (DE); Klaus Weinzierl, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 666 days.

(21) Appl. No.: 10/499,742

(22) PCT Filed: Oct. 24, 2003

(86) PCT No.: PCT/DE03/03542

§ 371 (c)(1),
(2), (4) Date: Jun. 17, 2004

(87) PCT Pub. No.: WO2004/042480

PCT Pub. Date: May 21, 2004

(65) Prior Publication Data

US 2005/0016712 A1 Jan. 27, 2005

(30) Foreign Application Priority Data

Nov. 6, 2002 (DE) ................................ 102 51 716

(51) Int. Cl.
*B22C 19/04* (2006.01)

(52) U.S. Cl. ............................. 266/96; 266/99; 164/452
(58) Field of Classification Search .................. 266/78, 266/96, 99; 164/452
See application file for complete search history.

(56) References Cited

U.S. PATENT DOCUMENTS 6,085,183 A * 7/2000 Horn et al. ..................... 706/45

* cited by examiner

*Primary Examiner*—Scott Kastler

(57) ABSTRACT

The temperature (T) of a metal (1) can be influenced directly or indirectly by at least one actuator (2) which is actuated in accordance with a control variable (S). The control variable (S) and starting values ($T_A$, $p1_A$, $p2_A$) for a temperature of the metal (1) and phase proportions in which the metal (1) is at least in a first phase or a second phase, respectively, are predetermined for a material model (5). A heat conduction equation and a transformation equation are solved in real time within the material model (5), taking account of these variables ($T_A$, $p1_A$, $p2_A$), and in this way expected values ($T_E$, $p1_E$, $p2_E$) are determined for these variables. As part of the transformation equation, the Gibbs' free energies (G1, G2) of the phases of the metal (1) are determined, a transformation rate of the metal (1) from the first phase to the second phase is determined therefrom, and the expected proportions ($p1_E$, $p2_E$) are determined from the latter.

30 Claims, 5 Drawing Sheets

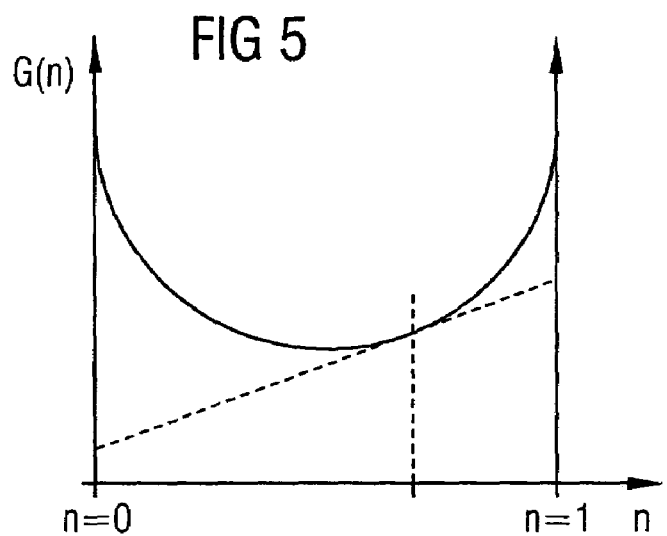
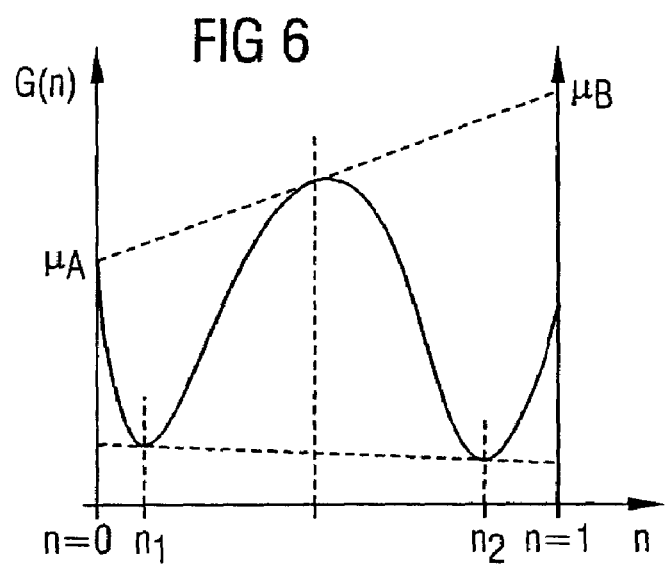
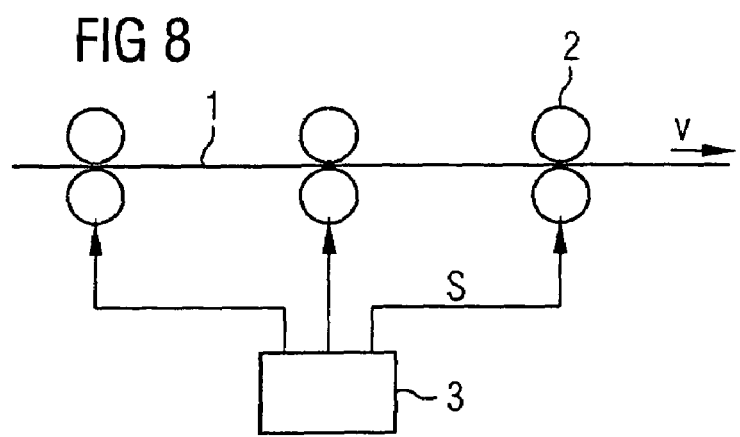

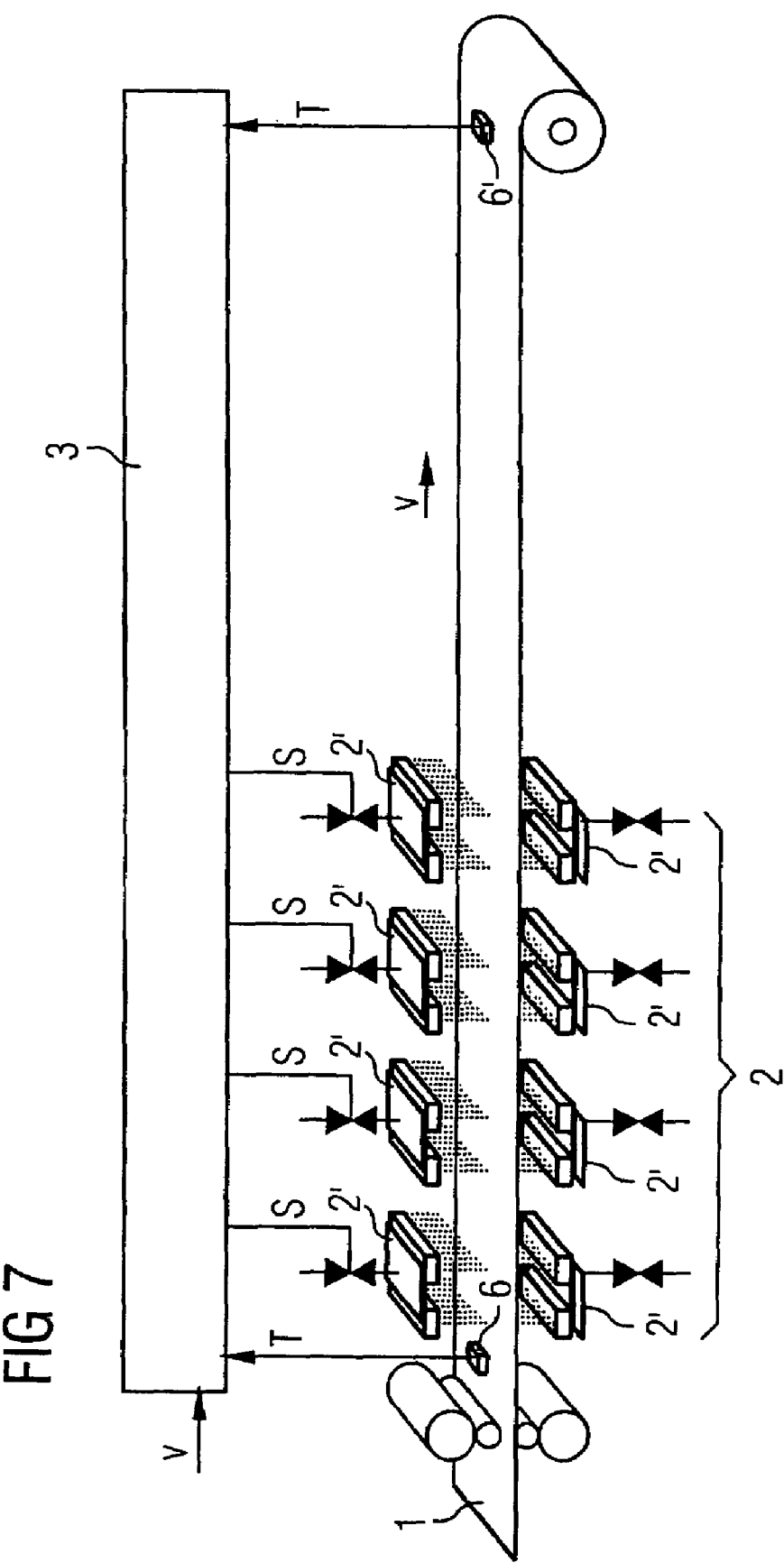

US 7,449,140 B2

MODELING METHOD FOR A METAL

CROSS REFERENCE TO RELATED APPLICATIONS

This application is the US National Stage of International Application No. PCT/DE2003/003542 filed Oct. 24, 2003 and claims the benefit thereof. The International Application claims the benefit of German application No. 10251716.9 filed Nov. 6, 2002, both of the applications are incorporated by reference herein in their entirety.

FIELD OF INVENTION

The present invention relates to a modeling method for a metal, the temperature of which can be influenced directly or indirectly by at least one actuator, a starting temperature of the metal and starting proportions, in which the metal is at least in a first phase or a second phase, respectively, being predetermined for a material model, a heat conduction equation and a transformation equation being solved in real time within the material model, taking account of the starting temperature, the starting proportions and a control variable for the actuator, so as to determine an expected temperature for the metal and expected proportions in which the metal is at least in the first phase or the second phase, respectively, the actuator being actuated in accordance with the control variable.

BACKGROUND OF INVENTION

Methods of this type are known, for example, from the article "Numerische Simulation der Wärmeleitung in Stahlblechen—Mathematik hilft bei der Steuerung von Kühlstrecken" [Numerical Simulation of the Heat Conduction in Steel Sheets—Mathematics helps to control cooling sections] by W. Borchers et al., published in Unikurier der Friedrich-Alexander-Universität Erlangen-Nürnberg, Volume 102, October 2001, 27th edition.

The known methods are used in particular to control coolant actuators in rolling mills. The coolant actuators may be arranged between the rolling stands. They may also be arranged downstream of the rolling stands. However, there are also other conceivable applications, for example in the context of calculating solidification processes in continuous casting or in the control of rolling mills per se.

In the prior art, the Scheil rule or the Johnson-Mehl-Avrami or Brimacombe approaches are used to determine the proportions of the phases.

The approaches used in the prior art in practice are not without faults in all cases. In particular, they have a range of systematic drawbacks. Firstly, each material has to be parameterized separately. Interpolations between different materials are not possible or at least are only possible to a limited extent. Secondly, the methods of the prior art consider only two phases. The system cannot be expanded to cover more than two phases. Thirdly, the methods of the prior art only provide good correspondence between model and reality if the metal under consideration is completely transformed. Fourthly, the method of the prior art does not give any information about the transformation heat released during the phase transformation. However, knowledge of the transformation heat is imperative if the heat conduction equation is to be correctly solved.

SUMMARY OF INVENTION

The object of the present invention is to provide a modeling method for a metal which gives better modeling results.

The object is achieved by virtue of the fact that as part of the transformation equation the Gibbs' free enthalpies of the phases of the metal are determined, a transformation rate of the metal from the first phase to the second phase is determined on the basis of the Gibbs' free enthalpies and the expected proportions are determined on the basis of the transformation rate.

The invention uses the concept of the Gibbs free enthalpy. Nevertheless, this name has not gained universal acceptance. To explain this, the introduction of thermodynamic potentials in physics is recalled here. Let's consider a volume fraction of material with the pressure p, the volume V, the temperature T, the entropy S and the free energy U. From the free energy U commonly three thermodynamic potentials are derived:

1.) The enthalpy $H=U+pV$,
2.) The free energy $F=U-TS$ (Helmholtz function)
3.) The free enthalpy $G=H-TS=F+pV=U+pV-TS$ (Gibbs function).

For example in the case of steel at air pressure there is only an almost constant and negligible difference pV between the free energy F and the free enthalpy G. In practice, any constant can be added to the four potentials U, H, F and G because there exists no method to measure absolute values (Since this holds for the entropy S also, it is even possible to add any linear function of T to F and G, respectively). Normally only differences between two working points can be measured. Hence, many engineers and researchers do not distinguish between the case 2.) and 3.) and use Gibbs free enthalpy or Gibbs free energy or free enthalpy or free energy or Gibbs function or Helmholtz function or F or G almost arbitrarily.

In the simplest case of the present invention—as in the prior art—a purely two-phase system is considered, for example a transformation from austenite into ferrite and vice versa. However, the invention can also readily be expanded to multiphase systems, in particular to the ferrite-austenite-cementite system.

In general, the proportions of the additives cannot be considered independently of one another. The—albeit linked—influence of additives on the Gibbs' free enthalpy is known, however. By way of example, reference is made to the specialist articles "Approximate Thermodynamic Solution Phase Data for Steels" by Jyrki Miettinen, Calphad, Vol. 22, No. 2, pages 275 to 300, 1998, and "A Regular Solution Model for Phases with Several Components and Sublattices, Suitable for Computer Applications" by Bo Sundman and John Agren, Journal Phys. Chem. Solids, Vol. 42, pages 297 to 301. Therefore, for steel it is possible to determine the Gibbs' free enthalpy of an iron carbon mixture as a function of the proportion of carbon and the temperature and to take account of the effects of the additives, e.g. Ni, Si, P, as a function of the iron-carbon mixture, and also the temperature. If the material model is designed in such a manner that the proportions of the additives can also be predetermined for it, it is therefore possible to determine the Gibbs' free enthalpies of the phases under consideration even for materials which are not explicitly predetermined.

If specific Gibbs' free enthalpies of the phases, i.e. Gibbs' free enthalpies which are based on a uniform quantity of the metal, are determined, it is possible to determine the transformation rate in a particularly simple way, namely on the basis of the difference between the specific Gibbs' free enthalpies.

Alternatively, it is possible to determine the transformation rate on the basis of the sum of the specific Gibbs' free enthalpies of the phases, weighted with the proportions of the phases.

Furthermore, it is possible to determine the transformation rate on the basis of the position integral over the specific Gibbs' free enthalpies. This type of determination is advantageous in particular if the Gibbs' free enthalpies of at least one of the phases are position-dependent.

If the metal contains at least two chemically different constituents, the Gibbs' free enthalpies can also be used to determine the distribution of the constituents between chemical compositions.

The modeling method according to the invention can also be employed if at least one of the phases corresponds to a liquid state of the metal. However, it is also possible for at least one (and preferably all) of the phases to correspond to a solid state of the metal.

It is possible for the method to be applied just once per metal. However, it is preferably applied at a multiplicity of locations in the metal which directly follow one another in terms of their position.

If at least one desired temperature is predetermined for the material model, it is possible for the material model to automatically determine the control variable. The desired temperature may in this case in particular be a (temporal) desired temperature curve.

The control variable may be a temporal control variable curve. In this case, it is possible in particular for the heat conduction equation and the transformation equation to be solved in steps using the control variable curve and in this way to determine an expected temperature curve for the metal and also expected proportion curves for the phases. In this case, the actuator is preferably only actuated after the heat conduction and transformation equations have been completely solved.

However, the control variable may also be a single value. In this case, it is only used for one step in each ase. In this case, the actuator is preferably actuated between the preceding step and the subsequent step.

The modeling method operates particularly reliably if the starting temperature is an actual temperature recorded by a measuring element before the metal is influenced by the actuator.

If a final temperature of the metal is recorded by a measuring element after the metal has been influenced by the actuator, the final temperature is compared with the expected temperature and the material model is adapted on the basis of the comparison, the material model becomes a self-teaching model.

It is preferable for the heat conduction equation which is to be solved for the interior of the metal 1 to take the form $$\frac{\partial H}{\partial t} - div\left[\frac{\lambda(H, p1, p2)}{\rho} \cdot \text{degrees } T(H, p1, p2)\right] = q'$$

here H is the enthalpy, t the time, λ the thermal conductivity, p1 and p2 the proportions of the phases, ρ the density and T the temperature of the metal. q' is a heat quantity which is generated within the metal by external influences, e.g. deformation during rolling or inductive heating. The transformation heat produced on account of phase transformations, by contrast, is already taken into account in the left-hand part of the equation.

The above, correct heat conduction equation can always be employed irrespective of the shape and state of the metal. If the metal is in the form of a metal strip with a strip thickness direction, it is possible to replace the equation given above by the simplified equation $$\frac{\partial H}{\partial t} - \frac{\partial}{\partial x}\left[\frac{\lambda(H, p1, p2)}{\rho} \cdot \frac{\partial T(H, p1, p2)}{\partial x}\right] = q'$$

where x is the location in the strip thickness direction.

BRIEF DESCRIPTION OF THE DRAWINGS

Further advantages and details will emerge from the following description of an exemplary embodiment in conjunction with the drawings, in which, in each case in outline form, FIGS. 5 and 6 show examples of curves for Gibbs' free enthalpies, and FIGS. 7 to 9 show further installations for influencing the temperature of a metal.

DETAILED DESCRIPTION OF INVENTION

Figure 1:
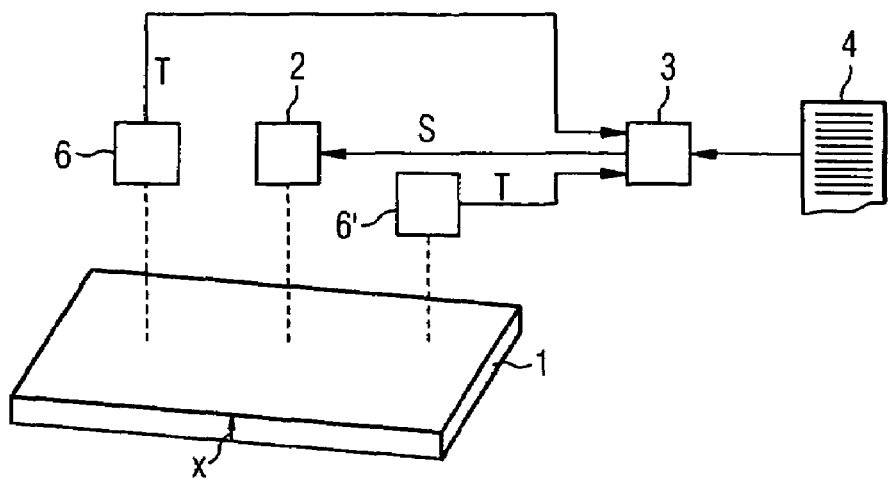
FIG. 1 shows an installation for influencing the temperature of a metal.

In accordance with FIG. 1, an installation for influencing the temperature of a metal 1 has an actuator 2. The temperature T of the metal 1 can be influenced directly or indirectly by means of the actuator 2, generally by cooling, but in some cases also by heating. By way of example, a defined quantity of a cooling medium (typically water) can be applied to the metal 1.

In the present case, the metal 1 is steel in solid state. However, it could also be in a liquid state. The metal 1 could also be a metal other than steel, e.g. aluminum or a nonferrous metal. According to FIG. 1, the metal 1 is furthermore designed as a metal strip with a strip thickness direction. However, other forms of the metal 1, e.g. profiled sections in rod form (e.g. wires), tubes or U-sections are also conceivable.

The installation is controlled by a control computer 3. In particular, the actuator 2 is also actuated by the control computer 3 in accordance with a control variable S. The control computer 3 is programmed with a computer program 4. On account of the programming with the computer program 4, the control computer 3—in addition to controlling the installation—also carries out a modeling method for the metal 1, which is described in more detail below.

Figure 2:
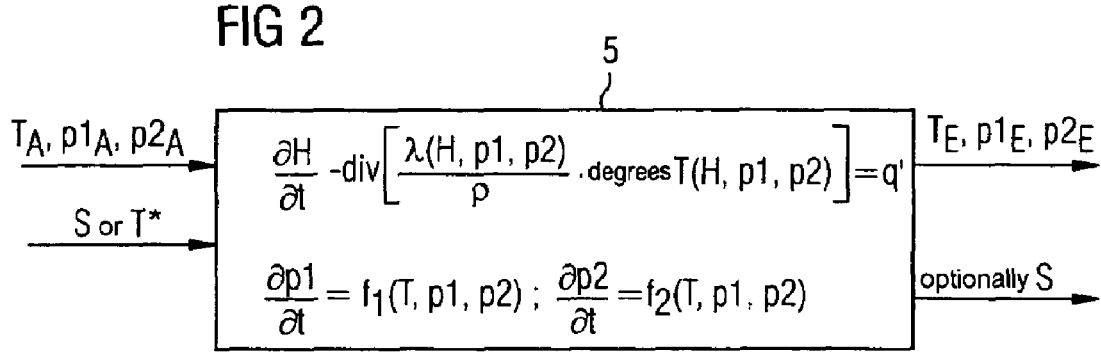
FIGS. 2 and 3 show material models.

As part of the execution of the modeling method, as shown in FIG. 2 a starting temperature $T_A$ of the metal 1 and starting proportions $p1_A$, $p2_A$, in which the metal 1 is in a first phase or a second phase, respectively, are predetermined for a material model 5 for the metal 1. The starting temperature $T_A$ may be an estimated value or a theoretically calculated value. Preferably, however—cf. FIG. 1—the installation has a measurement element 6. An actual temperature T of the metal can be recorded by means of the measuring element 6. In the present case, this recording of the actual temperature T takes place before the metal 1 is influenced by the actuator 2. The actual temperature T recorded at this instant is the starting temperature $T_A$, which is fed to the material model 5.

The starting proportion $p1_A$, $p2_A$ are generally values which are determined on the basis of calculations or are known on account of process conditions. For example, it is already known that the metal 1 is entirely in a liquid phase prior to casting. Alternatively, it is known that the material is austenite if steel is held for long enough at a temperature above the transformation temperature of steel.

Within the material model 5, in accordance with FIG. 2, the material equations are solved in real time for the nterior of the metal 1 taking account of these starting values $T_A$, $p1_A$, $p2_A$, the control variable S and the efficiency of the actuator 2. The material equations comprise a heat conduction equation of the form $$\frac{\partial H}{\partial t} - div\left[\frac{\lambda(H, p1, p2)}{\rho} \cdot \text{degrees } T(H, p1, p2)\right] = q'$$

and a transformation equation. In the equations, H is the enthalpy, t the time, $\lambda$ the thermal conductivity, p1 and p2 the proportions of the phases, $\rho$ the density and T the temperature of the metal 1. q' is a heat quantity which is generated within the metal 1 by external influences, e.g. deformation during rolling or inductive heating. The transformation heat produced on account of phase transformations, by contrast, is already taken into account in the left-hand part of the equation. Within the material model 5, therefore, an expected temperature $T_E$ for the metal 1 and expected proportions $p1_E$, $p2_E$ in which the metal 1 is in the first phase or the second phase, respectively, are determined in real time.

Figure 3:
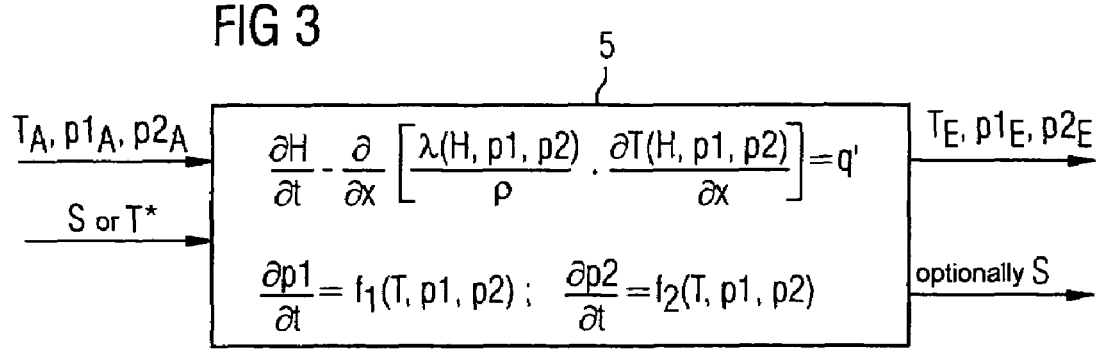

The solution to the heat conduction equation and also the way of taking account of the control variable S and the efficiency of the actuator 2 are generally known to those skilled in the art. Therefore, these details will not be dealt with further in the text which follows. It should merely be noted that the above mentioned heat conduction equation is the general equation to be solved irrespective of the state and shape of the metal 1. In the present case, in which the metal 1 is in the form of a metal strip with a strip thickness direction, the heat conduction equation in accordance with FIG. 3 can be formulated in one-dimensional form, since the gradients in the strip movement direction and in the strip width are substantially zero. In this case, therefore, the heat conduction equation can be simplified to $$\frac{\partial H}{\partial t} = \frac{\partial}{\partial x}\left[\frac{\lambda(H, p1, p2)}{\rho} \cdot \frac{\partial T(H, p1, p2)}{\partial x}\right] = q'$$

where x is additionally the location in the strip thickness direction.

Solving the transformation equation involves using a method which is explained in more detail below in conjunction with FIG. 4.

Figure 4:
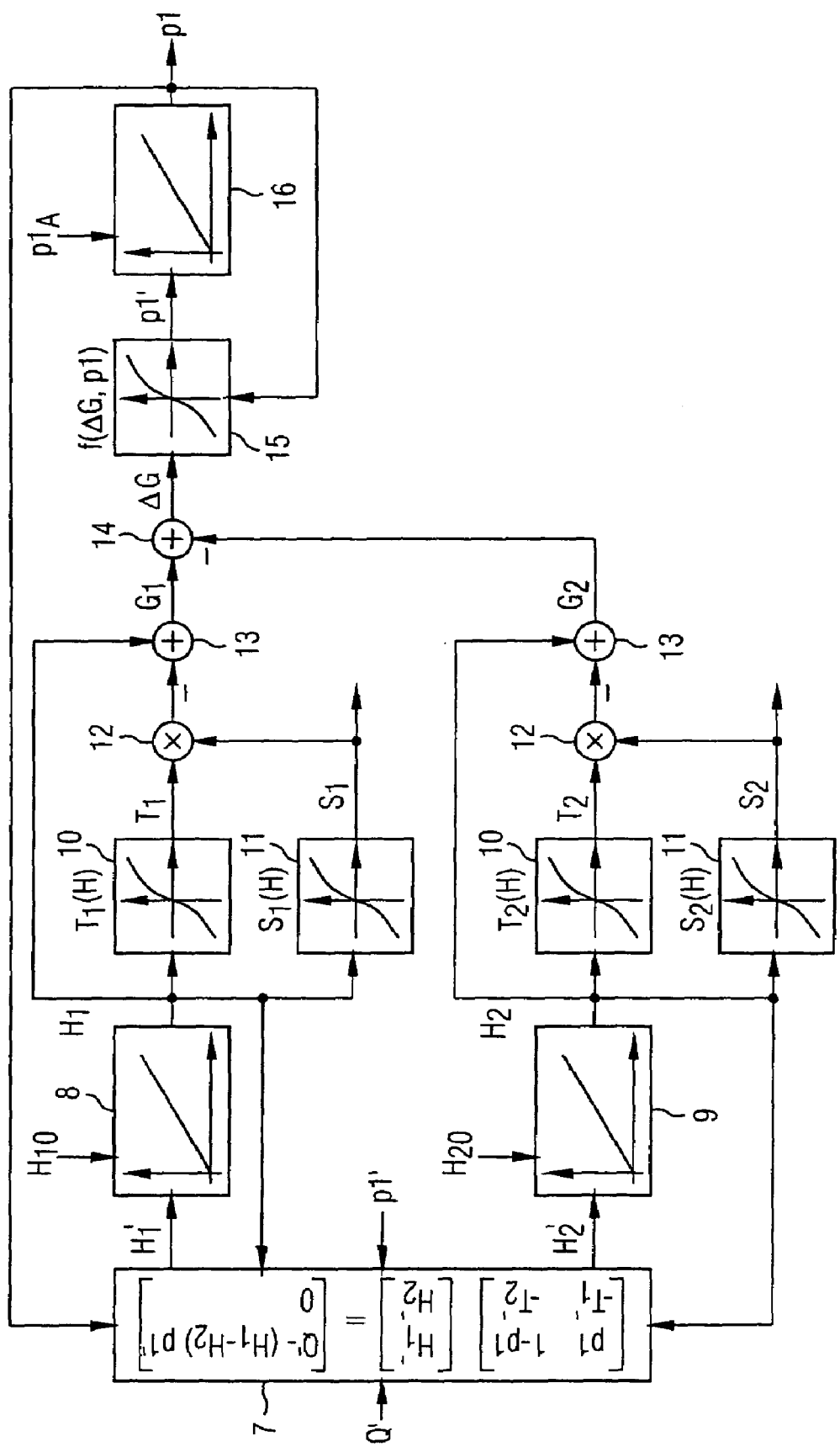
FIG. 4 shows a block diagram for solving a transformation equation.

In the illustration shown in FIG. 4, the simplifying assumption was made that the metal 1 can adopt two phases. However, the method can readily be expanded to a metal 1 comprising more than two phases.

In accordance with FIG. 4, a plurality of input variables are fed to an equation solution block 7. Fist of all, a heat quantity Q' is fed to the equation solution block 7. The heat quantity Q' comprises firstly the change in the heat balance on account of heat conduction and secondly if appropriate also the heat quantity q' generated within the metal 1 by external influences.

Then, the proportion p1 in which the metal 1 is in the first phase is fed to the equation solution block 7. The temporal change p1' is also fed to the equation solution block 7. On account of the fact that FIG. 4 considers only a two-phase system, therefore, the proportion p2 of the second phase and its change p2' are also known.

Finally, the enthalpies H1, H2 of the phases of the metal 1 are also fed to the equation solution block 7. The enthalpies H1, H2 are in this case based on a uniform quantity of the metal 1, for example one kilogram or one mol.

The equation solution block 7 uses the linear equation system $$\begin{bmatrix} p1H_1 + (1-p1)H_2 \\ -T_1(H_1) + T_2(H_2) \end{bmatrix} = \begin{bmatrix} Q - H_0 \\ 0 \end{bmatrix}$$

to determine the temporal changes H1', H2' in the enthalpies H1 and H2. These changes H1', H2' are fed to integrators 8, 9 which then determine the enthalpies H1, H2 as output signal.

The integrators 8, 9 are suitably initialized with starting values $H1_0$, $H2_0$. The starting values $H1_0$, $H2_0$ in this case cannot be predetermined independently of one another. Rather, they have to be determined in such a way that the resulting specific Gibbs' free enthalpies G1, G2 adopt the same value at the phase transformation temperature.

In the linear equation system, T1' and T2' are to be understood as meaning the first derivatives of the corresponding temperatures T1, T2 according to the respective enthalpy H1 or H2, i.e. not the temporal derivatives.

As an alternative to the linear equation system given above, it is also possible to solve a nonlinear equation system of the form $$\begin{bmatrix} p1H_1 + (1-p1)H_2 \\ -T_1(H_1) + T_2(H_2) \end{bmatrix} = \begin{bmatrix} Q - H_0 \\ 0 \end{bmatrix}.$$

$H_0$ is in this case a suitable starting value for the enthalpy H of the system. This equation system directly gives the enthalpies H1, H2. On the other hand, as has already been mentioned, it is not linear.

The determined enthalpy H1 is fed to a temperature-determining means 10, which uses the enthalpy H1 for the phase under consideration to determine the expected temperature T1. Furthermore, the enthalpy H1 is fed to an entropy-determining means 11, which uses the relationship $$S_1(H1) = \int_{H10}^{H1} \frac{1}{T_1(H)} dH$$

to determine the entropy S1 for the phase under consideration.

The expected temperature T1 and the determined entropy S1 are fed to a multiplier 12, the output signal of which is fed—with a negative sign—to an adder 13, which is also fed with the enthalpy H1. The output signal from the adder 13 corresponds to the specific Gibbs' free enthalpy G1 of the phase under consideration.

The corresponding specific Gibbs' free enthalpy G2 is determined analogously for the second phase. Then, the difference $\Delta G$ between the two specific Gibbs' free enthalpies G1, G2 is formed in an adder 14.

The difference ΔG between the specific Gibbs' free enthalpies G1, G2 determined in this way is fed to a means 15 for determining the transformation rate. This means uses the difference ΔG and the proportion p1 to determine the transformation rate. The transformation rate is fed to an integrator 16, which is additionally fed with the starting proportion $p1_A$ as starting value. The output signal from the integrator 16, i.e. the expected proportion $p1_E$ determined, is then fed back to the equation solution block 7 and the means 15 for determining the transformation rate.

As can be seen from FIG. 4, the transformation equation is solved in steps; in each step, the expected values previously determined are fed to the equation solution block 7. Similarly, the heat conduction equation is also solved in steps. Of course, the results of the heat conduction equation and transformation equation are adjusted after each step. The method is preferably applied for each reference point for the heat conduction equation. To save on calculation time, however, it is also possible to reduce the outlay involved in calculating the transformation model by combining reference points in the phase transformation. However, the heat conduction equation is always—i.e. in this case too—solved for each reference point.

Furthermore, the temperatures T1, T2, if they are calculated correctly, have the same value, also referred to below as the expected temperature $T_E$, at any instant. Any deviation between the temperatures T1, T2 is therefore an indication that the material model 5 is less than optimum. It can therefore be used as part of the programming compilation of the material model 5 to optimize the material model 5—in particular the entropy—and temperature-determining means 10, 11.

The method shown in FIG. 4, therefore, determines the temporal curves for the expected temperature $T_E$ and the expected proportions $p1_E$, $p2_E$.

In the case of the method shown in FIG. 4, the control variable S does not have to have the same value at any given instant. Rather, the control variable S may have a temporal curve, referred to below as the control variable curve. Therefore, the current value of the control variable S is also updated at each step. In the event of the treatment of the metal 1 only acting on the surface, for example when water is applied to the metal, it forms part of the boundary conditions which are to be observed when solving the heat conduction equation. If a treatment of the metal 1 affects its volume, for example a rolling operation or an inductive heating step, by contrast, the control variable S in particular forms part of the heat quantity Q'.

If the heat conduction and material equations are solved in steps, two alternative procedures are possible. Firstly, the actuator 2 can be actuated in accordance with the predetermined control variable curve S after the temporal curves for the expected temperature TE and the expected proportions $p1_E$, $p2_E$ have been determined. Secondly, however, it is also possible to use only the control variable S for the corresponding step and to actuate the actuator 2 in accordance with the control variable S between the preceding step and the subsequent step.

In both cases, it is possible for only the control variable S to be predetermined for the material model 5. However, in accordance with FIGS. 2 and 3, it is also possible for a desired temperature T*—or preferably even a temporal curve of the desired temperature T*—to be predetermined for the material model 5. In this case, it is possible for the material model 5 to determine the control variable S automatically on the basis of the desired temperature T*, the starting temperature $T_A$ and the efficiency of the actuator 2.

After the metal 1 has been influenced by the actuator 2, the actual temperature T of the metal 1 is recorded once again—in accordance with FIG. 1 by means of a further measuring element 6'. This temperature T, referred to below as the final temperature, is compared, as shown in FIG. 5, with the expected temperature $T_E$ by an adapter element 5'. The adapter element 5' then adapts the material model 5 on the basis of the comparison. By way of example, it is possible to vary heat transfer variables in the heat conduction equation or influencing variables for the transformation rates.

In accordance with the exemplary embodiment given, therefore, the specific Gibbs' free enthalpies G1, G2 of the phases, which are based on a uniform quantity of the metal 1, are determined. The transformation rate is then determined on the basis of the difference ΔG. In the simplest case, the transformation rate results as a product of a constant with the determined difference ΔG. In this case, however, it is advantageous to employ a means 15 for determining the transformation rate which determines the transformation rate p1' from the difference ΔG and the instantaneous phase proportion p1. A means 15 of this type for determining the transformation rate may, for example, be parameterized on the basis of a data set from TTT diagrams for various steels.

Furthermore, it would be entirely equivalent for the transformation rate to be determined on the basis of the sum of the specific Gibbs' free enthalpies G1, G2 weighted with the proportions p1, p2 of the phases. This makes use of the fact that the transformation, at a fixed temperature, automatically proceeds only in the direction of a decrease in the Gibbs' free enthalpy G.

The procedure described above in connection with FIG. 4 is appropriate in particular in the case of a pure phase transformation with the same chemical composition, for example a pure transformation from austenite to ferrite. It can also be employed if there is a pure transformation from a solid phase to a liquid phase or vice versa.

The above description of the determination of the proportions p1, p2 has in each case used the current instantaneous values for the specific Gibbs' free enthalpies G1, G2, for the specific entropies S1, S2, for the specific enthalpies H1, H2 and the expected temperatures T1, T2. However, the evaluation performed by the temperature- and entropy-determining means 10, 11 requires the functional curves or dependent relationships of the temperatures T1, T2 and the specific entropies S1, S2 with respect to the corresponding specific enthalpies H1, H2 to be known. Therefore, in order to enable the phase transformations to be described successfully and correctly, it is necessary for basic functions which are dependent on the currently modeled metal 1, in particular on its chemical composition, to be made available to the temperature-determining means 10 and the entropy-determining means 11. For this purpose, when the material model 5 is being developed, it is preferable first of all to determine the specific Gibbs' free enthalpies G1, G2 for the phases of the substance under consideration as a function of the temperature. Determination of the specific Gibbs' free enthalpy as a function of the temperature is described, for example, in the specialist article "A Thermodynamic Evaluation of the Fe—C System" by Per Gustafson in the Scandinavian Journal of Metallurgy 14 (1985), pages 259 to 267.

It is then readily possible to determine the functional curves of the temperatures T1, T2 or of the specific entropies S1, S2 as a function of the specific enthalpy H1, H2 on the basis of the specific Gibbs' free enthalpy G1 or G2 determined in this way as a function of the corresponding temperature T1 or T2, respectively—i.e. the functional curves of the specific Gibbs' free enthalpies G1, G2. This form of determination is one with which those skilled in the art will be generally familiar. For details, reference is made once again to the abovementioned article by Per Gustafson.

When the functional curves of the specific Gibbs' free enthalpies G1, G2 and also the functional curves of the temperatures T1, T2 and of the specific entropies S1, S2 are being determined, it is necessary in particular also to take into account the changes in the specific Gibbs' ,free enthalpies G1, G2 that are caused by additives. Therefore, the changes to the specific Gibbs' free enthalpies G1, G2 as a function of the added quantities of the additives under consideration are determined for the additives to be considered. Although with regard to the quantity of additive under consideration these changes may be highly nonlinear, they may also be dependent on one another. Both their action and their dependent relationships with respect to one another are known, however, cf. the abovementioned articles by J. Miettinen and by B. Sundman and J. Agren. As a result, therefore, the temperature-determining means 10 and the entropy-determining means 11 are also intended for unknown mixtures if the proportions of the additives are known. Therefore, it is also possible to model unknown mixtures (in particular unknown steel compositions) with a high degree of accuracy.

In practice, the metal 1 often has two chemically different base constituents. In the case of steel, these two constituents are typically iron (as the main constituent in amounts of significantly over 50 atom %) and carbon. In this case, first of all the specific Gibbs' free enthalpy G is determined as a function of the (relative) proportion n of one of the two constituents and the temperature. Then, it is once again determined how this function changes for the additives under consideration. In this case too, however, the changes may be highly nonlinear. This is true both with regard to the quantities of the additives and with regard to the effect of the same quantities of the additives at various iron and carbon mixing ratios. Therefore, it is quite possible for a specific quantity of additives (e.g. 1% of silicon and 2% of phosphorus) to have a completely different effect on the specific Gibbs' free enthalpy of an iron-carbon mixture comprising 1% of carbon and 99% of iron than on an iron-carbon mixture comprising 4% of carbon and 96% of iron. The percentages are in this case atomic percentages. It is also quite possible, for example, for double the quantity of the additives to have a completely different effect on the specific Gibbs' free enthalpy than the single quantity of the additives. However, it is moreover the case that the influences of the additives are known or can be determined in a known way.

The curve of the specific Gibbs' free enthalpy G determined in this way for the iron-carbon mixture can be used to determine the distribution of the metal 1 between chemical compositions of the constituents. This is explained in more detail below on the basis of the example of an iron-carbon mixture.

Assume the presence of a mixture of iron and carbon. In this context, $n_A$ is the proportion of iron, $n_B$ the proportion of carbon in the mixture. The sum of the proportions $n_A$, $n_B$ is of course one. Furthermore, assume that $n_{A1}$, is the proportion of iron in a first chemical composition, $n_{A2}$ is the proportion of iron in a second chemical composition. The sum of these proportions $n_{A1}$, $n_{A2}$ in this case of course corresponds to the total proportion $n_A$ of iron. Similarly, proportions $n_{B1}$, $n_{B2}$ of carbon are also contained in both compositions. The sum of these proportions $n_{B1}$, $n_{B2}$ once again results in the total proportion $n_B$ of carbon. With $m_1 = n_{A1} + n_{B1}$ and $m_2 = n_{A2} + n_{B2}$, proportions for the respective composition are introduced. Therefore, the Gibbs' free enthalpy G of the overall system turns out to be $$G = m_1 \cdot G1\left(\frac{n_{B1}}{n_{A1}+n_{B1}}\right) + m_2 \cdot G2\left(\frac{n_{B2}}{n_{A2}+n_{B2}}\right)$$

(Complete) differentiation of this equation according to $n_{A1}$ and $n_{B1}$ and zeroing the derivatives gives two equations and therefore two conditions for the proportions $n_{A1}$ and $n_{B1}$. In this context, it must be borne in mind that in this equation $m_1$, $m_2$ and the argument of G2 implicitly include $n_{A1}$ and $n_{B1}$ as variables.

If the Gibbs' free enthalpy G of the iron-carbon mixture as a function of the proportion n of carbon has a convex curve, as illustrated by way of example in FIG. 5, it is not possible to divide it into two chemical compositions in which the proportionally weighted sum of the specific Gibbs' free enthalpies G1, G2 is lower than the Gibbs' free enthalpy of the uniformly mixed system. In this case, the equations are linearly dependent. The result is a uniform chemical composition of the metal 1.

On the other hand, if, as illustrated by way of example in FIG. 6, the Gibbs' free enthalpy G as a function of the carbon content is not exclusively convex, it is possible to perform this division into two different chemical compositions in which the proportionally weighted sum of the specific Gibbs' free enthalpies G1, G2 is lower than the Gibbs' free enthalpy G of the uniform mixture. In this case, the equations are linearly independent. This results in unambiguous values for the proportions $n_{A1}$, $n_{A2}$, $n_{B1}$ and $n_{B2}$. In this case, the metal 1 is broken down into two different chemical compositions. The compositions have mixing ratios $n_1$ or $n_2$. The mixing ratios $n_1$, $n_2$ are defined by the equations $$n_1 = \frac{n_{B1}}{n_{A1}+n_{B1}} \text{ or } n_2 = \frac{n_{B2}}{n_{A2}+n_{B2}}$$

respectively.

In practice, it is often necessary to employ mixtures of these two procedures. For example, a relatively large quantity of carbon is soluble in austenite. On the other hand, only a small quantity of carbon is soluble in ferrite. Therefore, during cooling austenite breaks down into a mixture of ferrite and pearlite, wherein pearlite is a eutectic mix comprising cementite ($Fe_3C$) and ferrite and has formed as a result of carbon-saturated austenite cooling to below the temperature of the surrounding walls.

The phase transformation rate is described by what is known as a transformation diffusion model. In this case, the various phases are separated from one another by moveable phase boundaries. There are moveable and non-moveable elements within each phase. The non-moveable elements are distributed uniformly. The moveable elements are not generally distributed uniformly within the phase. The diffusion of the moveable elements in each phase is toward the negative gradient of the associated chemical potential. The diffusion rate of the moveable elements is in this case finite. The chemical potential is obtained by differentiation of the specific Gibbs' free enthalpies (i.e. the Gibbs' free enthalpies based on identical quantities) on the basis of the concentration of the moveable elements. The precise presentation of the diffusion for one or more moveable elements is known to those skilled in the art. To determine the speed at which the phase interface is moving, the difference between the specific Gibbs' free enthalpies immediately in front of and immediately behind the phase interface is to be formed at the free phase interface. This task is referred to by those skilled in the art as the free boundary problem with diffusion or also as the Stefan problem and is generally known. An approximated solution is to be found, for example, in Kar, A. and Mazumder, J.: Analytic Solution of the Stefan Problem in Finite Mediums. Quart. Appl. Math., Vol. 52, 1994.

In the context of the present invention, a dedicated transformation rate can be determined for each transformation—both for a phase transformation per se and for decomposition of a chemical composition into other chemical compositions. Overall, it can be stated that the transformation phenomenon at any time is moving in the direction of a decrease in the Gibbs' free enthalpy G of the overall system. Therefore, the above model proposal can also be formulated without explicit use of the difference between the specific Gibbs' free enthalpies G1, G2 at the phase interfaces. In particular taking account of the cooling behavior of the metal 1, therefore, it is possible to make a statement not only on the phase state of the metal 1 but also on its microstructure and grain size.

In accordance with FIG. 7, the installation is designed as a cooling device for the metal 1. The actuator 2 is designed as a coolant actuator 2. It is either arranged between rolling stands of a rolling mill or downstream of the rolling stands. It can apply defined quantities of a coolant, typically water, to the metal 1 via individually actuatable sections 2'.

As has been stated above in connection with FIG. 1, the temperature T of the metal 1 is in each case recorded by means of measuring elements 6, 6'. If the cooling device is arranged exclusively downstream of the rolling stands, the measuring element 6 is arranged downstream of the final rolling stand and upstream of the cooling device. Otherwise, it is preferable for the measuring element 6 to be arranged upstream of the rolling stand(s) which precede(s) the cooling device and for the measuring element 6' to be arranged downstream of the rolling stand(s) which precede(s) the cooling device.

When the cooling section is operating, as part of the cycle, the starting temperature $T_A$ of the metal 1 is recorded by means of the measuring element 6 each time the heat conduction and transformation equations are being solved. Furthermore, a material velocity v is fed to the material model 5. This enables the material model 5 to carry out material monitoring with regard to the locations in the metal 1 at which the starting temperature $T_A$ was recorded, and in this way to actuate the individual sections 2' of the actuator 2 at the correct time. It is also possible for the final temperature T to be recorded at the correct time by means of a further measuring element 6' at the end of the cooling section and for this temperature to be assigned to the corresponding location of the metal 1. In the embodiment shown in FIG. 7, therefore, the modeling method is applied at a multiplicity of locations in the metal 1 which directly follow one another in terms of their position.

In the example shown in FIG. 7, the direction of flow of the material is always identical. However, it is also possible for the direction of flow of the material to change. For example, in the case of a plate mill train, the material can be returned to the rolling stand for cooling purposes and subjected to a further rolling operation with a subsequent cooling operation.

Figure 9:
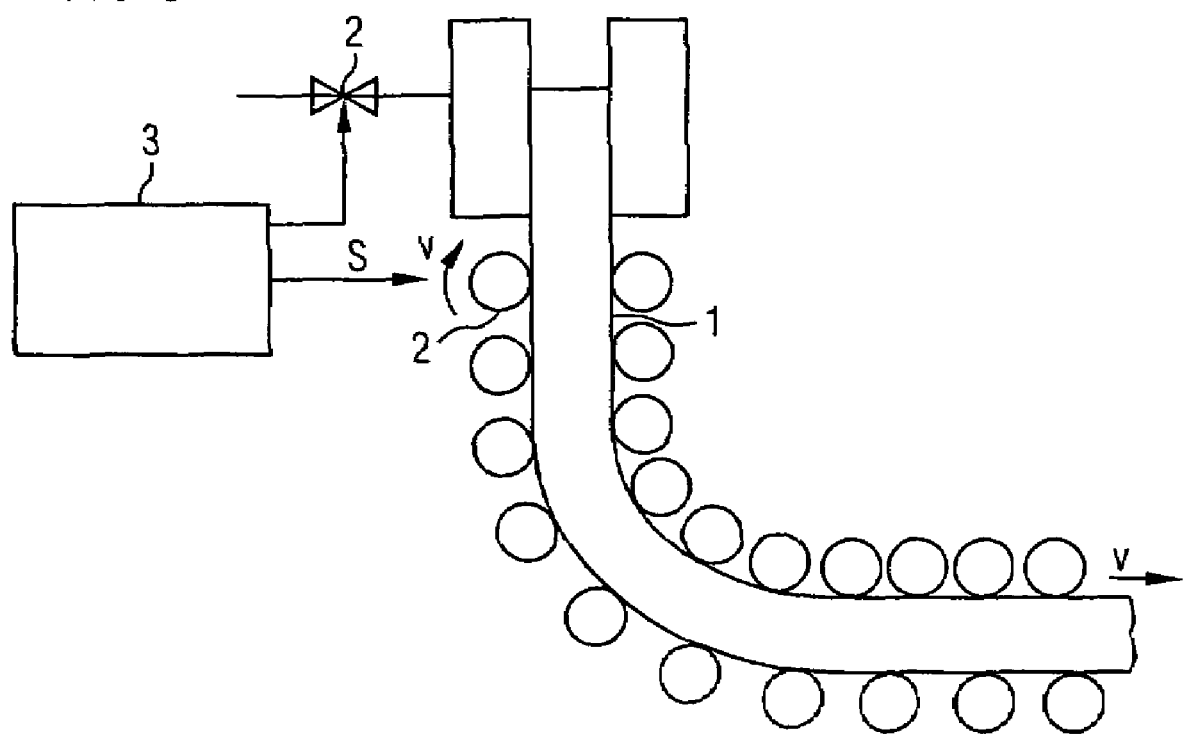

FIGS. 8 and 9 show further possible applications for the modeling method according to the invention.

In accordance with FIG. 8, the installation is designed as a rolling mill train. In the present case, the actuator 2 is one of the rolling stands, and the corresponding control variable S is the rolling speed. If appropriate, the actuator 2 may also be a combination of a rolling stand and a cooling device. In this case, of course, the control variable S is also a combined control variable.

In the embodiment shown in FIG. 9, the installation is designed as a continuous-casting installation. The actuator 2 is designed as a combined actuator, by means of which on the one hand the cooling of the permanent mold of the continuous-casting installation is influenced, and on the other hand the discharge velocity v at which the cast strand 1 is discharged from the permanent mold.

The present invention has numerous advantages. Firstly, the material model 5 of the present invention, given complete parameterization with respect to the possible additives, makes it possible to obtain generally valid results which allow the treatment even of unknown material classes and individual materials. Furthermore—unlike with the approaches used by Scheil and Avrami—the transformation behavior is described correctly even in the case of incomplete transformation. In this case, unlike in the methods of the prior art, the transformation heat produced during the phase transformation is determined correctly and taken into account within the scope of the material model 5. In particular, however, the complicated topology of phase diagrams and TTT diagrams is returned to the parameterization of standard smooth curves. As a result, technical processing of the dependent relationship among alloying elements, which is extremely complex in the case of steel, becomes possible for the first time, since if the pressure and temperature T of the system under consideration—in this case of the metal 1—are kept constant, the Gibbs' free enthalpy G of the system seeks to adopt its minimum value. A comparison of the Gibbs' free enthalpies G1, G2 of various phases therefore indicates the direction of the phase transformation. In this case, it is even possible to process the extremely difficult case of a metal with additives and compounds such as cementite ($Fe_3C$) as phases in a physically correct manner. Finally, the approaches can be applied not only to temperature calculation but also to the calculation of microstructure and grain size.

The invention claimed is:

1. A modeling method for a metal, comprising:
   providing at least one actuator for influencing the temperature of the metal;
   predetermining a starting temperature of the metal and starting proportions, in which the metal is at least in a first phase or a second phase, for a material model;
   solving a heat conduction equation and a transformation equation in real time within the material model, taking account of the starting temperature, the starting proportions and a control variable for the actuator;
   determining an expected temperature for the metal and expected proportions in which the metal is at least in the first phase or the second phase; and
   controlling the actuator in accordance with the control variable wherein solving the heat conduction equation and the transformation equation includes:
   determining the Gibbs' free enthalpies of the phases of the metal as part of the transformation equation;
   determining a transformation rate of the metal from the first phase to the second phase on the basis of the Gibbs' free enthalpies; and
   determining the expected proportions on the basis of the transformation rate so that actuator control may be adjusted based on values obtained from solving the equations to control temperature, proportions, microstructure or grain size during fabrication.

2. The modeling method as claimed in claim 1, wherein determination of specific Gibbs' free enthalpies of the phases is based on a uniform quantity of the metal, and the transformation rate is determined on the basis of the difference between the specific Gibbs' free enthalpies of the phases.

3. The modeling method as claimed in claim 1, wherein specific Gibbs' free enthalpies are determined based on a uniform quantity of the metal, and the transformation rate is determined on the basis of the sum of the specific Gibbs' free enthalpies of the phases, weighted with the proportions of the phases.

4. The modeling method as claimed in claim 1, wherein specific Gibbs' free enthalpies are determined based on a uniform quantity of the metal, and determination of the specific Gibbs' free enthalpy of at least one of the phases is position-dependent, and the transformation rate is determined on the basis of the position integral over the specific Gibbs' free enthalpy of the phases.

5. The modeling method as claimed in claim 1, wherein the metal comprises at least two chemically different constituents, and wherein the Gibbs' free enthalpies are used to determine the distribution of the constituents between chemical compositions.

6. The modeling method as claimed in claim 5, wherein one constituent of the metal is iron or carbon.

7. The modeling method as claimed in claim 1, wherein at least one of the phases is a liquid state of the metal.

8. The modeling method as claimed in claim 1, wherein at least one of the phases is a solid state of the metal.

9. The modeling method as claimed in claim 1, wherein the modeling method is applied at a multiplicity of locations in the metal process which directly follow one another in terms of their position.

10. The modeling method as claimed in claim 1, wherein at least one desired temperature is predetermined for the material model, and wherein the material model automatically determines values of the control variable according to a temporal variation.

11. The modeling method as claimed in claim 10, wherein the desired temperature is based on a predetermined temperature curve such that the material model automatically determines the control variable on the basis of the desired temperature and starting temperature.

12. The modeling method as claimed in claim 1, wherein values of the control variable are based on a control variable curve, the heat conduction equation and the transformation equation are solved in steps using the control variable curve, and in this way an expected temperature curve for the metal and expected proportion curves for the phases are determined, wherein the actuator is only actuated in accordance with the control variable curve after the expected temperature curve for the metal and the expected proportion curves for the phases have been determined.

13. The modeling method as claimed in claim 1, wherein the heat conduction equation and the transformation equation are solved in steps, and in this way an expected temperature curve for the metal and expected proportion curves for the phases are determined, and wherein the actuator is actuated in accordance with the control variable between a preceding step and a subsequent step.

14. The modeling method as claimed in claim 1, wherein the starting temperature is an actual temperature of the metal recorded by a measuring element before the metal is influenced by the actuator.

15. The modeling method as claimed in claim 1, wherein after the metal has been influenced by the actuator, a measuring element records a final temperature of the metal, wherein the final temperature is compared with the expected temperature, and wherein the material model is adapted on the basis of the comparison.

16. The modeling method as claimed in claim 1, further comprising solving the heat conduction equation in the form $$\frac{\partial H}{\partial t} - div\left[\frac{\lambda(H, p1, p2)}{\rho} \cdot \text{degrees } T(H, p1, p2)\right] = q'$$

where H is the enthalpy, t the time, λ the thermal conductivity, p1 and p2 the proportions of the phases, ρ the density and T the temperature of the metal and q' is a heat quantity which is generated by external influences within the metal.

17. The modeling method as claimed in claim 1, wherein the metal is in the form of a metal strip with a strip thickness direction, and in that the heat conduction equation which is to be solved for the interior of the metal takes the form $$\frac{\partial H}{\partial t} - \frac{\partial}{\partial x}\left[\frac{\lambda(H, p1, p2)}{\rho} \cdot \frac{\partial T(H, p1, p2)}{\partial x}\right] = q'$$

where H is the enthalpy, t the time, x the location in the strip thickness direction, λ the thermal conductivity, p1 and p2 the proportions of the phases, ρ the density and T the temperature of the metal and q' is a heat quantity which is generated by external influences within the metal.

18. The modeling method as claimed in claim 1, wherein the metal comprises iron as its main constituent.

19. The modeling method as claimed in claim 1, wherein the method is performed by a computer program.

20. The modeling method as claimed in claim 19, wherein the computer program is part of a control unit which is operatively adapted with an installation having an actuator for influencing the temperature of a metal.

21. An installation, comprising:
   an actuator for influencing the temperature of a metal; and
   a control processor programmed to
   (i) predetermine a starting temperature of the metal and starting proportions, in which the metal is at least in a first phase or a second phase, in accord with a material model;
   (ii) solve a heat conduction equation and a transformation equation in real time within the material model, including determining the Gibbs' free enthalpies of the phases of the metal as part of the transformation equation, and taking account of the staffing temperature, the starting proportions and a control variable for the actuator; and
   (iii) determine an expected temperature for the metal and expected proportions in which the metal is at least in the first phase or the second phase;
   (iv) control the actuator in accordance with the control variable; and
   determine the expected proportions on the basis of the transformation rate so that actuator control may be adjusted based on values obtained from solving the equations to control temperature, proportions, microstructure or grain size during fabrication.

22. The installation as claimed in claim 21, wherein it is designed as a cooling device for a metal, and wherein the actuator is a coolant actuator.

23. The installation as claimed in claim 22, wherein at least one rolling stand of a rolling mill is arranged downstream of the cooling device.

24. The installation as claimed in claim 22, wherein the cooling device is arranged downstream of at least one rolling stand of a rolling mill.

25. The installation as claimed in claim 21, wherein it is designed as a rolling mill train, and wherein the actuator is designed as a rolling speed actuator.

26. The installation as claimed in claim 21, wherein it is designed as a continuous-casting installation.

27. The installation as claimed in claim 21, wherein it is designed as a continuous-casting installation for casting a strip with a strip thickness of between 40 and 100 mm, with a finishing train arranged directly downstream of it.

28. The installation as claimed in claim 21, wherein it is designed as a thin-strip casting installation for casting a metal strip with a strip thickness of at most 10 mm and with at most two rolling stands arranged downstream of it.

29. The installation as claimed in claim 21, wherein the control processor is a computer.

30. A modeling method for a metal, the temperature of which can be influenced directly or indirectly by at least one actuator, a starting temperature of the metal and staffing proportions, in which the metal is at least in a first phase or a second phase, respectively, being predetermined for a material model, a heat conduction equation and a transformation equation being solved in real time within the material model, taking account of the starting temperature, the starting proportions and a control variable for the actuator, so as to determine an expected temperature for the metal and expected proportions in which the metal is at least in the first phase or the second phase, respectively, the actuator being actuated in accordance with the control variable, characterized in that as part of solving the transformation equation the Gibbs' free enthalpies of the phases of the metal are determined, a transformation rate of the metal from the first phase to the second phase is determined on the basis of the Gibbs' free enthalpies and the expected proportions are determined on the basis of the transformation rate so that actuator control may be adjusted based on values obtained from solving the equations in order to control temperature, proportions, microstructure or grain size during fabrication.

* * * * *